(12) United States Patent
Yamaya et al.

(10) Patent No.: US 10,713,513 B2
(45) Date of Patent: Jul. 14, 2020

(54) OBJECT DETECTION DEVICE, OBJECT DETECTION METHOD, AND RECORDING MEDIUM

(71) Applicant: CASIO COMPUTER CO., LTD., Shibuya-ku, Tokyo (JP)

(72) Inventors: Takashi Yamaya, Fussa (JP); Kouichi Nakagome, Tokorozawa (JP); Keisuke Shimada, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 96 days.

(21) Appl. No.: 15/904,314

(22) Filed: Feb. 24, 2018

(65) Prior Publication Data
US 2018/0285672 A1 Oct. 4, 2018

(30) Foreign Application Priority Data
Mar. 28, 2017 (JP) ................. 2017-062621

(51) Int. Cl.
*G06K 9/20* (2006.01)
*G06K 9/32* (2006.01)
(Continued)

(52) U.S. Cl.
CPC ................ *G06K 9/20* (2013.01); *G06F 3/16* (2013.01); *G06F 3/167* (2013.01);
(Continued)

(58) Field of Classification Search
CPC ...... G06K 9/20; G06K 9/2054; G06K 9/2063; G06K 9/00228; G06K 9/00201; G06K 9/00208; G06K 9/00221; G06K 9/00234; G06K 9/00248; G06K 9/00261; G06K 9/00664; G06K 9/00671; G06K 9/00677; G06K 9/3233; G06K 9/3241
(Continued)

(56) References Cited

U.S. PATENT DOCUMENTS 6,853,880 B2   2/2005   Sakagami et al.
8,472,667 B2   6/2013   Suzuki
(Continued)

FOREIGN PATENT DOCUMENTS

DE   102012215322 A1 *   3/2014   ......... G06K 9/00798
JP   2003062777 A        3/2003
(Continued)

OTHER PUBLICATIONS

Japanese Office Action dated Nov. 12, 2019 (and English translation thereof) issued in Japanese Patent Application No. 2017-062621.

*Primary Examiner* — Dwayne D Bost
*Assistant Examiner* — Stephen M Brinich
(74) *Attorney, Agent, or Firm* — Holtz, Holtz & Volek PC (57) ABSTRACT

The present invention is to reduce the time required to detect an object after completion of the rotation of a head or a body of a robot. A robot 100 includes a camera 111, and a control unit 127 which determines an overlapping area between a first image captured with the camera 111 at first timing and a second image captured with the camera 111 at second timing later than the first timing to detect an object included in an area of the second image other than the determined overlapping area.

13 Claims, 9 Drawing Sheets

(51) Int. Cl.
*G06F 3/16* (2006.01)
*G06K 9/00* (2006.01)

(52) U.S. Cl.
CPC ..... *G06K 9/00228* (2013.01); *G06K 9/00664* (2013.01); *G06K 9/3233* (2013.01); *G06K 2009/2045* (2013.01)

(58) Field of Classification Search
USPC ................ 382/100, 103–104, 106–107, 236
See application file for complete search history.

(56) References Cited

U.S. PATENT DOCUMENTS

| 8,582,810 B2 * | 11/2013 | Campbell | ............... G06T 7/254 345/427 |
| 2010/0119177 A1 | 5/2010 | Suzuki | |
| 2015/0178884 A1 * | 6/2015 | Scholl | ................... G06T 3/0018 348/36 |

FOREIGN PATENT DOCUMENTS

| JP | 2003122394 A | 4/2003 |
| JP | 2004198656 A | 7/2004 |
| JP | 2006251266 A | 9/2006 |
| JP | 2010085688 A | 4/2010 |
| JP | 2010114785 A | 5/2010 |
| JP | 2011087037 A | 4/2011 |
| JP | 2014229015 A | 12/2014 |
| JP | 2015043507 A | 3/2015 |

* cited by examiner

OBJECT DETECTION DEVICE, OBJECT DETECTION METHOD, AND RECORDING MEDIUM

CROSS-REFERENCE TO RELATED APPLICATION

This application is based upon and claims the benefit of priority from the prior Japanese Patent Application No. 2017-062621, filed Mar. 28, 2017, the entire contents of which are incorporated herein by reference.

BACKGROUND OF THE INVENTION

1. Field of the Invention

The present invention relates to an object detection device, an object detection method, and a recording medium.

2. Description of the Related Art

There are known robots each having a form that imitates a human being or an animal and capable of communicate with human beings such as a conversation. Among such robots, there is a robot that performs face recognition based on output of sensors, such as a camera and a microphone, mounted in an own machine, to determine that there is someone around the own machine as a result of the face recognition in order to make a move such as to talk to or wave hands to that person.

Japanese Patent Application Laid-Open No. 2004-198656 teaches that a robot performs face recognition to identify who is the confronting talker in order to perform speech recognition on a reply to the identified talker.

SUMMARY OF THE INVENTION

According to one aspect of the present invention, an object detection device includes: a determination section which determines an overlapping area between a first image captured by an imaging unit at first timing, and a second image captured by the imaging unit at second timing later than the first timing; and an object detection section which detects an object included in an area of the second image other than the overlapping area determined by the determination section.

According to another aspect of the present invention, an object detection method includes: a determination step of determining an overlapping area between a first image captured at first timing and a second image captured at second timing later than the first timing; and an object detection step of detecting an object included in an image of an area of the second image other than the overlapping area determined in the determination step.

According to still another aspect of the present invention, there is provided a non-transitory computer-readable recording medium with a program recorded thereon, the program causing a computer to implement: a determination function of determining an overlapping area between a first image captured at first timing and a second image captured at second timing later than the first timing; and an object detection function of detecting an object included in an image of an area of the second image other than the overlapping area determined by the determination function.

BRIEF DESCRIPTION OF THE SEVERAL VIEWS OF THE DRAWING

These and other features of the invention can be more deeply understood upon consideration of the following detailed description, taken in conjunction with the accompanying drawings.

DETAILED DESCRIPTION OF THE INVENTION

Embodiment

Figure 1:
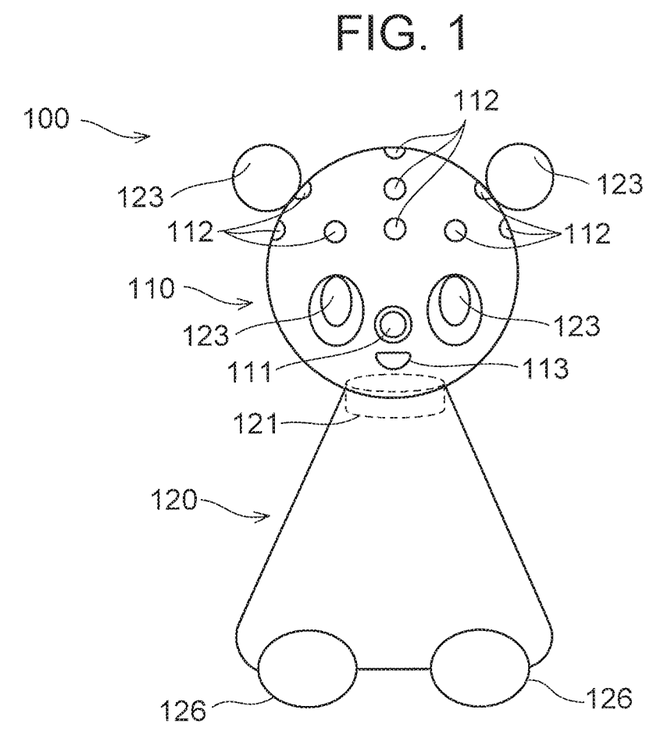
FIG. 1 is an external view of a robot according to an embodiment of the present invention.

An embodiment of the present invention will be described below with reference to the accompanying drawings. FIG. 1 is a diagram schematically illustrating the appearance of a robot 100 according to the embodiment as viewed from the front. The robot 100 is a humanoid communication robot having a head 110 and a body 120. The robot 100 is placed in a house, and when called by a resident, the robot 100 has a conversation with the resident who called the robot 100.

As illustrated in FIG. 1, a camera 111, microphones 112, and a speaker 113 are provided in the head 110 of the robot 100.

The camera 111 (imaging unit) is provided on the lower side of the front face of the head 110 at a position corresponding to a nose on a human face. The camera 111 performs imaging under the control of a control unit 127 to be described later.

The microphones 112 (sound detection unit) include 13 microphones. Eight microphones among the 13 microphones are arranged at regular intervals around the circumference of the head 110 in positions corresponding to the height of a forehead on the human face. Then, four microphones are arranged at regular intervals around the circumference of the head 110 above these eight microphones. Further, one microphone is arranged on the top of the head 110. The microphones 112 detect sounds generated around the robot 100.

The speaker 113 is provided at a position below the camera 111, which corresponds to a mouth on the human face. The speaker 113 outputs various voices under the control of the control unit 127 to be described later.

Figure 2:
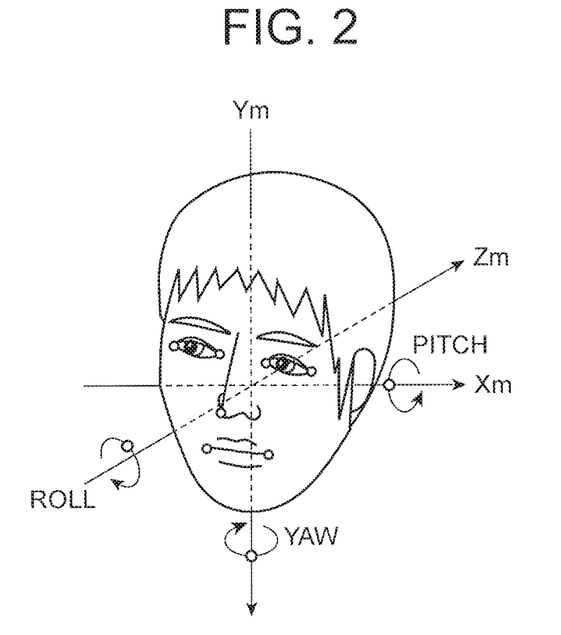
FIG. 2 is a diagram for describing the degrees of freedom of a head of the robot.

A neck joint 121 is a member to couple the head 110 and the body 120 together. The head 110 is coupled to the body 120 by the neck joint 121 indicated by the broken line. The neck joint 121 includes plural motors. When the control unit 127 to be described later drives these plural motors, the head 110 of the robot 100 rotates. FIG. 2 schematically illustrates the degrees of freedom of rotation of the head 110 of the robot 100. The head 110 of the robot 100 is rotatable with respect to the body 120 through the neck joint 121 about a pitch axis Xm, a roll axis Zm, and a yaw axis Ym. The neck joint 121, together with undercarriage parts 126 to be described later, plays a role as a working part that get each region of the robot 100 to work.

Figure 3:
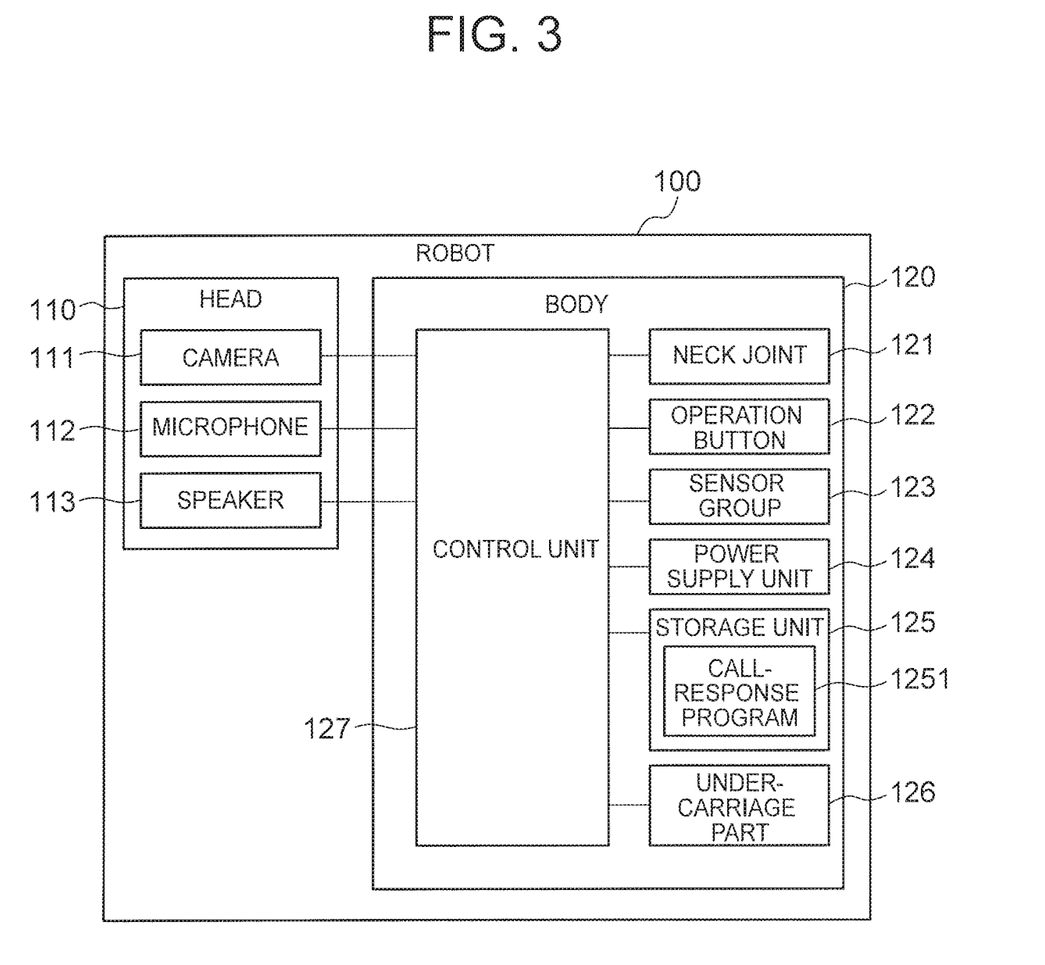
FIG. 3 is a block diagram illustrating the configuration of the robot.

Referring to FIG. 3, the robot 100 includes, in addition to the above-mentioned structure, operation buttons 122, a sensor group 123, a power supply unit 124, a storage unit 125, the undercarriage parts 126, and the control unit 127.

The operation buttons 122 are provided on the back of the body 120 (not illustrated in FIG. 1). The operation buttons 122 are various buttons used to operate the robot 100, including a power button, a volume control button of the speaker 113, and the like.

As illustrated in FIG. 1, the sensor group 123 is provided at positions corresponding to eyes and ears of the human face. The sensor group 123 includes an acceleration sensor, an obstacle detection sensor, and the like, used to control the attitude of the robot 100 and ensure safety.

Referring to FIG. 3, the power supply unit 124 is a rechargeable buttery incorporated in the body 120 to supply power to each part/unit of the robot 100.

The storage unit 125 includes a hard disk drive, a flash memory, and the like, which is provided inside the body 120. The storage unit 125 stores programs executed by the control unit 127 to be described later, and various data including image data captured by the camera 111. The programs stored in the storage unit 125 include a call-response program 1251 related to call-response processing to be described later.

The undercarriage parts 126 include four wheels provided on the lower side of the body 120. As illustrated in FIG. 1, two of four wheels are arranged on the front side of the body 120, and the other two wheels are arranged on the rear side (not illustrated). For example, an omni wheel or a mecanum wheel is used as each wheel. When the control unit 127 to be described below rotates each wheel of the undercarriage parts 126, the robot 100 moves. The undercarriage parts 126 play a role as a working part to get each region of the robot 100 to work together with the neck joint 121 as described above.

Referring to FIG. 3, the control unit 127 is composed of a processor, a RAM (Random Access Memory), and the like. The control unit 127 is connected to each part/unit of the above-mentioned robot 100 to control each part/unit of the robot 100 by using the RAM as a work space and executing a program stored in the storage unit 125.

Figure 4:
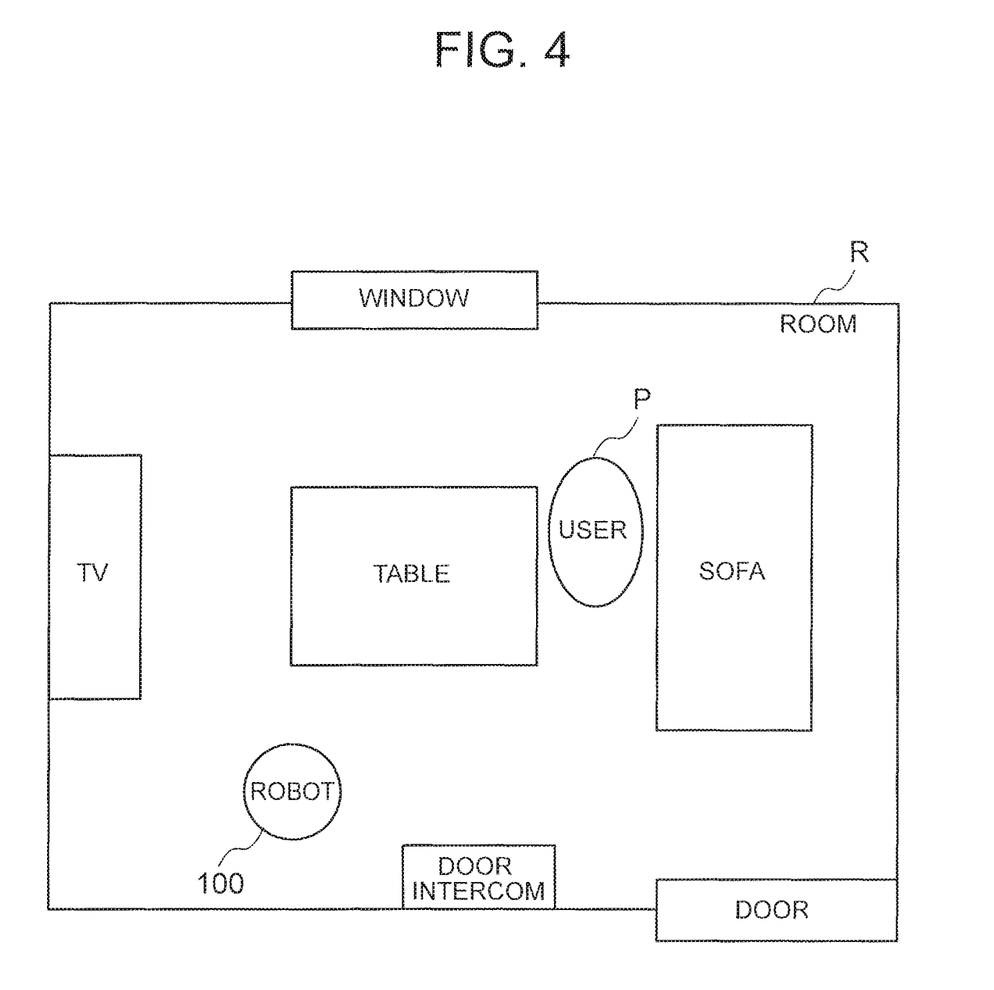
FIG. 4 is a diagram illustrating an example of the positions of the robot and a user in a room.

As described above, since the robot 100 converses with a resident (user) when being called, when determining that the robot 100 is called, there is a need to perform object detection processing on the resident (user) who called the robot 100. Although the object may be the face of the resident (user), the body of the resident (user), an object that emits a sound, or an object capable of being captured, the following description will be made by taking, as an example, a case where the face of the resident (user) is detected in the object detection processing performed by the robot 100. Here, an example in which the robot 100 performs face detection of the user in a series of processing for making a response to a user's call (call-response processing) will be described. As illustrated in FIG. 4, a case is assumed where the robot 100 and a user P exist in a room R and the robot 100 and the user P do not confront each other. When the user P calls the robot 100, the robot 100 turns its neck toward the user P to perform face recognition of the user P. Further, the robot 100 moves a distance to a position capable of having a conversation with the user P to make a conversation with the user P. Here, a scene is assumed where the TV in the room R is off, a door intercom does not ring, and there is no outdoor sound. In other words, such a scene that the sound source is only the user P is assumed.

In the embodiment, part of the face detection processing (hereinafter called distributed face detection processing) is performed while the head 110 of the robot 100 is rotating to accelerate the completion of the face detection processing, rather than to perform face detection after the rotation of the head 110 of the robot 100 is completed.

The control unit 127 executes the call-response program 1251 stored in the storage unit 125 to perform the following call-response processing, which functions as a sound source direction determining section which determines the direction of the sound source of a voice input to the microphones 112, a determination section which determines an overlapping area of captured images captured at different times, and a face detection section which detects a human face included in the captured images.

Referring to a flowchart of FIG. 5, the call-response processing will be described. The control unit 127 determines whether a certain loudness of sound is detected around the robot 100 (step S101). Specifically, the control unit 127 determines whether a sound with an amplitude equal to or more than a predetermined threshold is input to one or more microphones 112. Note that the certain loudness depends on the input sensitivity of each of the microphones 112.

When the certain loudness of sound cannot be detected by the microphones 112 (NO in step S101), the control unit 127 waits until the sound is detected.

On the other hand, when determining that the certain loudness of sound is detected (Yes in step S101), the control unit 127 determines whether the sound detected by the microphones 112 is a human voice (step S102). Specifically, the control unit 127 determines whether the sound detected in step S101 is in a specific frequency band (a frequency pattern of the human voice). When the sound detected in step S101 is not the human voice (No in step S102), the control unit 127 returns to step S101 to wait until the sound is detected.

On the other hand, when determining that the sound is the human voice (Yes in step S102), the control unit 127 performs voice localization to determine the position of the sound source (here, the position of the user P who emits the voice) (step S103). Here, MUSIC (MUltiple SIgnal Classification) as one technique for sound source localization is adopted to estimate the position of the sound source. Note that it is assumed that the user P as the sound source stands still without moving during the sound source localization.

Figure 6:
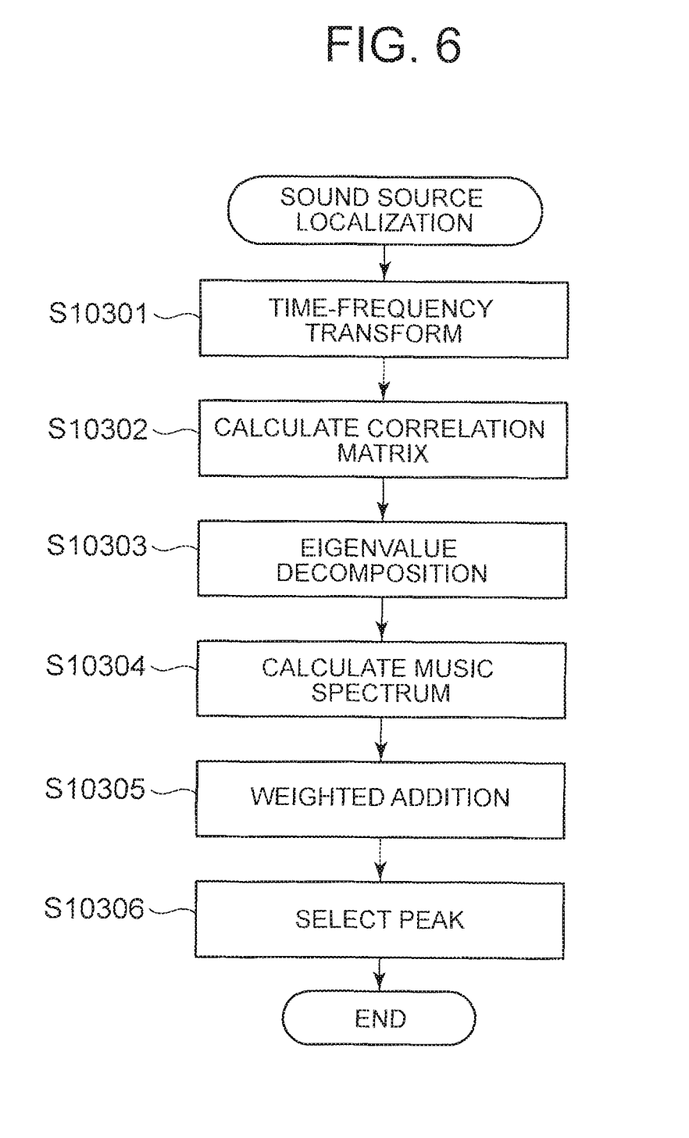
FIG. 6 is a flowchart of sound source localization processing.

FIG. 6 illustrates a flowchart of sound source localization processing using MUSIC. Referring to FIG. 6, the sound source localization processing will be described below.

First, time-frequency transform of a voice input to the microphones 112 is performed (step S10301). Here, SIFT (Short-Time Fourier Transform) is performed as the time-frequency transform.

When the number of sound sources is denoted by N, a signal Sn of the n-th sound source can be represented by the following expression (1):

$$Sn(\omega, f)(n=1, 2, \ldots, N) \quad (1),$$

where ω denotes the angular frequency and f denotes the frame number (the same applies in the following description).

When the number of microphones 112 is denoted by M, the signal observed at each microphone 112 can be represented by the following expression (2):

$$Xm(\omega, f)(m=1, 2, \ldots, M) \quad (2)$$

The sound emitted from the sound source is observed at the microphone 112 through the air. When the transfer function at the time is denoted by Hnm(ω), the signal observed at the microphone 112 can be determined by multiplying, by the transfer function, a numerical formula that represents the sound source signal. A signal Xm(ω,f) observed at the m-th microphone 112 is expressed by the following equation (3).

[Math. 1]

$$X_m(\omega, f) = \sum_{n=1}^{N} S_n(\omega, f) H_{nm}(\omega) \quad (3)$$

Since the robot 100 has plural microphones 112, a signal x(ω,f) observed at all the microphones 112 can be expressed by the following equation (4).

[Math. 2]

$$x(\omega, f) = \begin{bmatrix} X_1(\omega, f) \\ X_2(\omega, f) \\ \vdots \\ X_M(\omega, f) \end{bmatrix} \quad (4)$$

Similarly, a signal s(ω,f) of all the sound sources can also be expressed by the following equation (5).

[Math. 3]

$$s(\omega, f) = \begin{bmatrix} S_1(\omega, f) \\ S_2(\omega, f) \\ \vdots \\ S_N(\omega, f) \end{bmatrix} \quad (5)$$

Similarly, the transfer function hn(ω) of the n-th sound source can be expressed by the following equation (6).

[Math. 4]

$$h_n(\omega) = \begin{bmatrix} H_{n1}(\omega) \\ H_{n2}(\omega) \\ \vdots \\ H_{nM}(\omega) \end{bmatrix} \quad (6)$$

All the transfer functions are represented by the following equation (7).

$$h(\omega) = [h1(\omega), h2(\omega), \ldots hN(\omega)] \quad (7)$$

When the transfer function expressed by the above equation (7) is applied to the above equation (3), the following equation (8) is obtained.

$$x(\omega, f) = h(\omega) s(\omega, f) \quad (8)$$

In this equation, hn(ω) is independent in terms of the position of each sound source. Since Sn(ω,f) is regarded as uncorrelated in terms of a certain number of frames (for example, when the number of frames is L), x(ω,f) forms a hyperplane using the number of sound sources, N, as RANK. In this case, the distribution tends to spread in a transfer function direction of a sound source louder in volume normalized in distance. Therefore, decomposition into a subspace and a null space is considered.

Referring to FIG. 6 again, a correlation matrix is calculated as represented in the following equation (9) (step S10302). Here, * denotes a complex conjugate transpose.

[Math. 5]

$$R(\omega, f) = \sum_{l=0}^{L-1} x(\omega, f+1) x^*(\omega, f+1) \quad (9)$$

Then, eigenvalue decomposition is performed (step S10303). Here, it is assumed that eigenvalues λm(ω,f) and eigenvectors em(ω,f) are rearranged to make the eigenvalues in descending order.

In principle, hn(ω) can be restored from the weighted addition of the eigenvector em(ω,f) (m=1 to N) of the subspace, but it is actually difficult to restore hn(ω). Therefore, the sound source localization is realized by using the fact that the eigenvectors em(ω,f) (m=N+1 to M) that constitute the null space are orthogonal to hn(ω).

However, since there is a possibility that the user P as the sound source moves in the room R, the sound source position cannot be known in advance, and this makes it difficult to acquire the transfer function of the sound source position in advance. Therefore, provisional sound source positions are determined, and transfer functions of the provisional sound source positions are prepared in advance to perform sound source localization.

Figure 7:
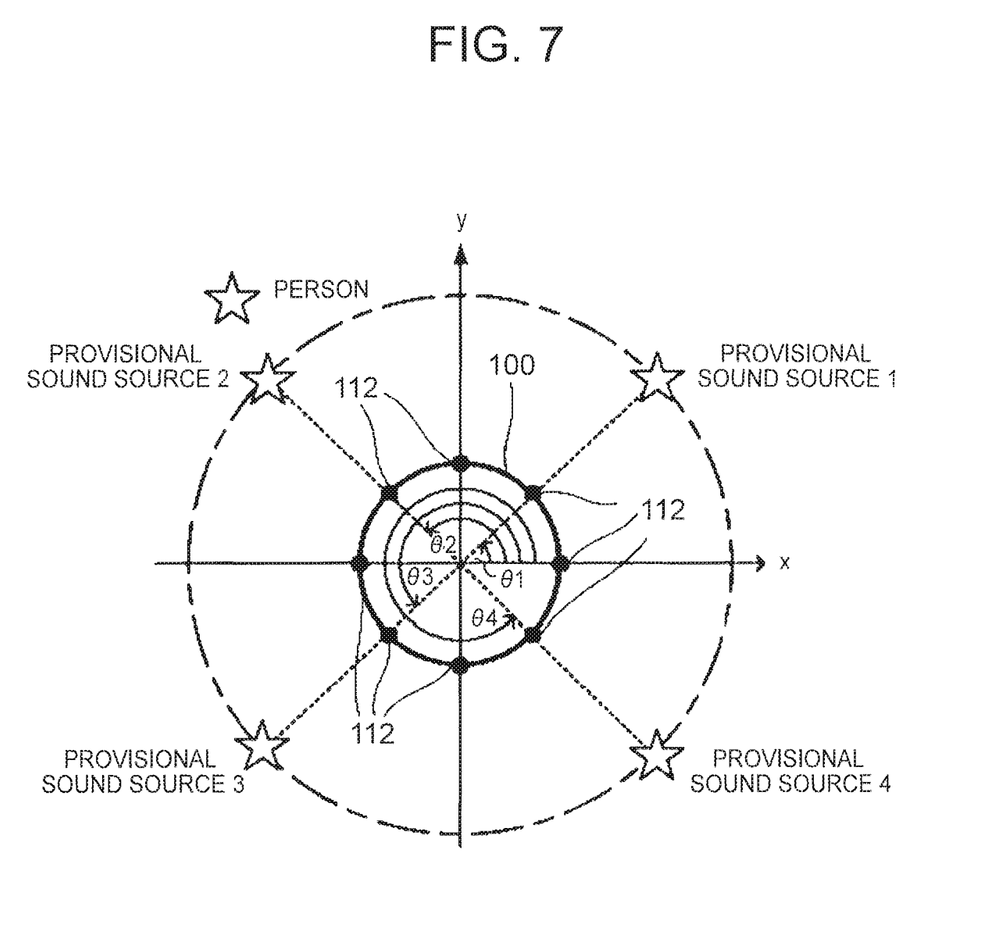
FIG. 7 is a diagram for describing provisional sound source positions.

An example of the arrangement of the provisional sound source positions and the microphones is illustrated in FIG. 7. In FIG. 7, the thick-line circle indicates the head 110 of the robot 100, and the black dot on the thick line indicates each of the microphones 112. Here, all the 13 microphones 112 are not illustrated for convenience. It is assumed that there are four provisional sound source positions around the robot 100.

Since the plural microphones 112 are arranged around the head 110 of the robot 100, it can be considered that the microphones 112 are arranged along the circumference.

Angles between the X-axis positive direction and respective lines connecting the center of a circle formed by the microphones 112 (corresponding to the center position of the head 110 of the robot 100) with respective provisional sound sources 1 to 4 are denoted by θ1, θ2, θ3, and θ4, respectively, and transfer functions hθ(ω) for respective angles are calculated in advance.

In FIG. 7, the case where the number of sound sources is four is illustrated, but when the number of sound sources is denoted by N, the transfer functions hθ(ω) have only to be calculated in advance for θ1, θ2, . . . θN, respectively. Alternatively, the transfer functions may be calculated in advance based on geometric information, rather than that the transfer functions of the provisional sound source positions are prepared.

Next, a MUSIC spectrum is calculated for each frequency band by using Equation (10) (step S10304).

[Math. 6]

$$M_\theta(\omega, f) = \frac{h_\theta^*(\omega) h_\theta(\omega)}{\sum_{m=N+1}^{M} |h_\theta^*(\omega) e_m(\omega \cdot f)|^2} \quad (10)$$

Here, the denominator in Equation (10) does not become zero due to noise, an error, the influence of SIFT signal leakage between frequency bands, and the like. Further, when the direction of the sound source and any of predetermined angles θ (θ1, θ2, . . . θN) are close to each other, i.e., when hn(ω) and hθ(ω) are close to each other, the value of Equation (10) becomes extremely large. In the example illustrated in FIG. 7, since the positions of a person as the sound source and the provisional sound source 2 are close to each other, when the transfer function for θ2 is used, the value of Equation (10) is expected to become extremely large.

Then, weighted addition is performed on the MUSIC spectrum of each frequency band as expressed in Equation (11) to obtain integrated MUSIC power (step S10305).

[Math. 7]

$$M(f) = \sum_\omega w(\omega) M(\omega, f) \quad (11)$$

If the weighting factor is made larger as the eigenvalue λm(ω,f) is larger, a calculation according to the power included in Sn(ω,f) can also be made. In this case, adverse effects when there is little power in Sn(ω,f) can be reduced.

Subsequently, an appropriate peak (maximum value) is selected from the power spectrum (step S10306). Specifically, pural peaks are first determined to select an appropriate peak from among the determined peaks and set θ at the selected peak as the sound source direction. Here, the reason for determining peaks is as follows: Since power at θ in the direction of the original sound source is not always the highest and the power at θ in any direction close to the direction of the original sound source becomes high as a whole, the correct answer to the sound source direction is any of the plural peaks.

Further, even when there are other sound sources in the room R, such as that the TV is on and the door intercom rings, it is considered that the person will call the robot 100 in a voice louder than the ambient sounds, such as the TV and the door intercom, in many cases. Since the power of the person's voice is expected to be larger than the power of sound emitted from each of the other sound sources such as the TV and the door intercom, there is no problem even if θ indicative of the position of a provisional sound source simply with the highest power is selected as the sound source direction. Note, however, that the position of a provisional sound source with power, which is the second highest or lower, rather than the position of the provisional sound source with the highest power, may be selected appropriately as the sound source direction, depending on the surrounding environment, and the like. Thus, the sound source direction, i.e., the direction in which there is the user P as seen from the position of the robot 100 can be determined in this case.

The sound source localization processing is described above. Here, although the description is made assuming the plane, the above description holds true even under the assumption of a three-dimensional space.

Referring to FIG. 5 again, when the sound source localization in step S103 is executed to determine the sound source direction, the control unit 127 stores, in the storage unit 125 as information indicative of the sound source direction, the angle θ indicative of the direction of the sound source with respect to the direction in which the robot 100 faces. Then, the control unit 127 proceeds to step S104 to perform distributed face detection processing. In the distributed face detection processing, the camera 111 performs imaging one or more times after the start of the rotation of the head 110 of the robot 100 until the completion of the rotation to perform the face detection processing on the captured image(s).

Since the rotation of the head of the robot 100 is completed when the head faces in the sound source direction, images captured before completion of the rotation of the head 110 of the robot 100 include or do not include part of an image captured upon completion of the rotation.

Figure 8A:
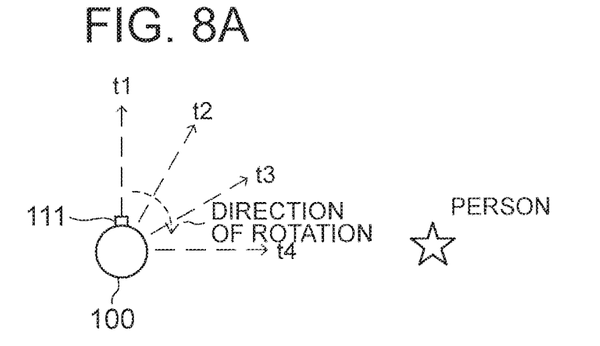
FIG. 8A is a diagram illustrating an example of respective positions of the robot and the user in the room.

A specific example will be described with reference to FIG. 8. FIG. 8A illustrates an example of the positional relationship between the robot 100 and the user P in the room R. Here, the lens of the camera 111 of the robot 100 is facing in the upper-side direction before the start of the rotation. Then, when detecting a voice of the user P, the robot 100 is expected to rotate clockwise about 90 degrees to make the lens of the camera 111 face the user P.

Suppose that imaging is performed at time t1 as a time point of start of the rotation, time t2 after time t1, and time t3 after time t2, respectively. Note that time t4 is a time point of completion of the rotation.

Figure 8B:
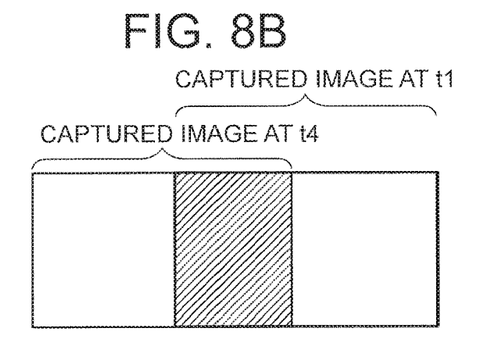
FIG. 8B is a diagram for describing an overlapping range between a captured image during rotation and a captured image upon completion of the rotation.

An overlapping area between a captured image at time t1 and an image expected to be captured with the camera 111 at time t4, at which the rotation is completed, is illustrated in FIG. 8B. The hatched range is the overlapping area therebetween. The overlapping area is determined based on the angle of the camera 111, the angle of the head 110 to be rotated, which is obtained based on the current imaging direction of the camera 111 and the sound source direction, the attitude of the robot 100, the speed of rotation of the neck joint 121, and the like.

Figure 8C:
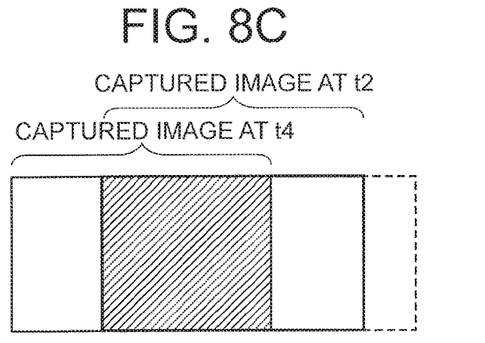
FIG. 8C is a diagram for describing an overlapping range between a captured image during rotation and a captured image upon completion of the rotation.

An overlapping area between a captured image at time t2 and the image expected to be captured with the camera 111 at time t4, at which the rotation is completed, is illustrated in FIG. 8C. The hatched range is the overlapping area therebetween. Since the head 110 is in the process of being rotated, the overlapping range (the hatched range in FIG.

8C) between time t2 and time t4 is wider than the overlapping range (the hatched range in FIG. 8B) between time t1 and time t4.

Figure 8D:
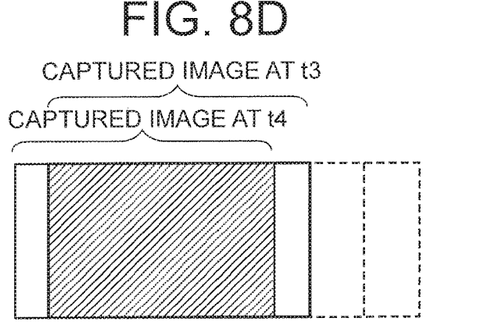
FIG. 8D is a diagram for describing an overlapping range between a captured image during rotation and a captured image upon completion of the rotation.

An overlapping area between a captured image at time t3 and the image expected to be captured with the camera 111 at time t4, at which the rotation is completed, is illustrated in FIG. 8D. The hatched range is the overlapping area therebetween. since the head 110 is in the process of being further rotated, the overlapping range (the hatched range in FIG. 8D) between time t3 and time t4 is wider than the overlapping range (the hatched range in FIG. 8C) between time t2 and time t4.

In the embodiment, face detection processing is performed on an area (the hatched range in FIG. 8B) of the image overlapping with the image expected to be captured with the camera 111 at time t4 among images captured after imaging at time t1.

After imaging at time t2, the face detection processing is performed on an area excluding a part overlapping with a range processed after imaging at time t1 in the range (the hatched part in FIG. 8C) of the image overlapping with the image expected to be captured with the camera 111 at time t4 among the captured images.

After imaging at time t3, the face detection processing is performed on an area excluding a part overlapping with a range processed after imaging at times (time t1 and time t2) before time t3 in the range (the hatched part in FIG. 8D) of the image overlapping with the image expected to be captured with the camera 111 at time t4 among the captured images.

Thus, an overlapping area between an image (first image) captured at timing (first timing) during rotation and an image (second image) captured at timing (second timing) after the completion of rotation is determined. During the rotation, the face detection processing is performed on the overlapping area and an area in which the face detection processing is not performed. Then, after completion of the rotation, the face detection processing is performed on an area other than the determined overlapping area.

Specific distributed face detection processing performed by the control unit 127 will be described with reference to a flowchart of distributed face detection processing in FIG. 9.

First, the control unit 127 initializes detected area data stored in the storage unit 125 (step S10401). The detected area data include information indicative of a range in which the face detection processing is completed. As mentioned above, since the face detection processing is performed plural times during the rotation, this is not to perform duplicate processing on the range in which the face detection processing is already performed.

Here, the detected area data include information on the coordinates indicating a range of an image expected to be captured with the camera 111 at a rotation-completed position (expected, captured image upon completion of the rotation) and a range in which the face detection is performed by using images captured during the rotation in the range.

Figure 10A:
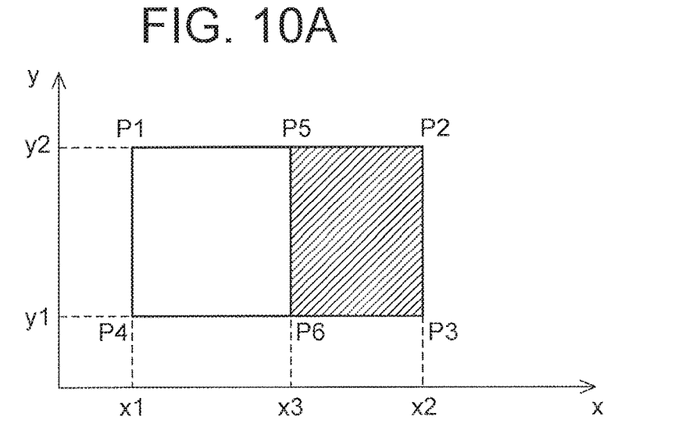
FIG. 10A is a diagram for describing an area as a target of face detection during rotation.

For example, as illustrated in FIG. 10A, it is assumed that the expected, captured image upon completion of the rotation is in a range connecting four points of coordinates P1 (x1, y2), P2 (x2, y2), P3 (x2, y1), and P4(x1, y1). It is further assumed that the overlapping area of the image captured at time t1 with the expected, captured image is in a hatched range connecting four points of coordinates P5 (x3, y2), P2 (x2, y2), P3 (x2, y1), and P6 (x3, y1).

After imaging at time t1, since no face detection is performed before then, face detection processing is performed on the hatched range in FIG. 10A. After the processing, four coordinate values of coordinates P5, P2, P3, and P6 are stored in the detected area data.

Figure 10B:
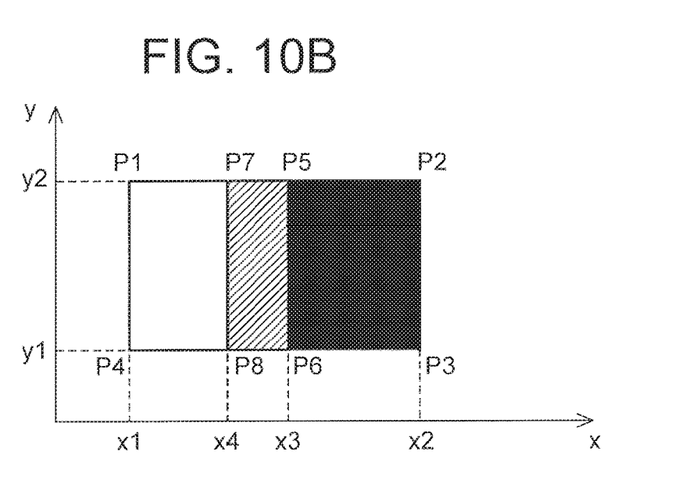
FIG. 10B is a diagram for describing an area as a target of face detection during rotation.

As illustrated in FIG. 10B, it is assumed that the overlapping area of the image captured at time t2 with the expected, captured image is in a range connecting four points of coordinates P7, P2, P3, and P8. At this time, since the four coordinate values of coordinates P5, P2, P3, and P6 are stored in the detected area data, a range, obtained by subtracting the range connecting the four points of coordinates P5, P2, P3, and P6 as the detected area from a range connecting the four points of coordinates P7, P2, P3, and P8, becomes a target area for face detection after imaging at time t2.

When the face detection processing after imaging at time t2 is completed, four coordinate values of coordinates P7, P2, P3, and P8 are stored in the detected area data.

Figure 10C:
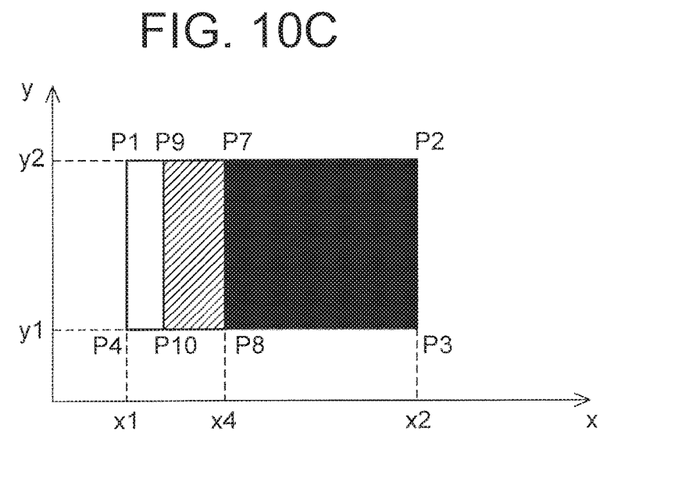
FIG. 10C is a diagram for describing an area as a target of face detection during rotation.

As illustrated in FIG. 10C, it is assumed that the overlapping area of the image captured at time t3 with the expected, captured image is in a range connecting four points of coordinates P9, P2, P3, and P10. At this time, since the four coordinate values of coordinates P7, P2, P3, and P8 are stored in the detected area data, a range, obtained by subtracting the range connecting the four points of coordinates P7, P2, P3, and P8 as the detected area from the range connecting the four points of coordinates P9, P2, P3, and P10, becomes a target area for face detection after imaging at time t3.

Note that the range connecting four points of coordinates P1, P9, P10, and P4, on which no face detection processing is performed in FIG. 10C, are subjected to face detection after completion of the rotation.

Although the details will be described later, since the visibility of the camera by the rotation varies according to the distance to a target, pyramid images (a series of images created by repeatedly reducing an original image by a constant fraction) are used in the face detection to be described below, and a face detector is applied to each level of the pyramid of images. In FIG. 10A to FIG. 10C, although only one level of range is illustrated, face detection is actually performed on plural levels of captured images.

Referring to FIG. 9 again, the control unit 127 then drives the motors of the neck joint 121 to start the rotation of the head 110 (step S10402). Here, the control unit 127 rotates the head 110 until the front of the head 110 of the robot 100 (the lens surface of the camera 111) faces in the direction of the sound source (user P). Specifically, the control unit 127 controls the neck joint 121 to rotate the head 110 of the robot 100 by an angle θ determined by the sound source localization stored in the storage unit 125.

The control unit 127 controls the camera 111 to perform imaging (step S10403), and stores a captured image in the storage unit 125. Further, the control unit 127 acquires, from the storage unit 125, external camera parameters (rotation matrix and translation vector) at such a position that the camera 111 performed imaging, and stores, in the storage unit 125, information on the captured image in association with the external camera parameters. The external camera parameters are based on the position at which the rotation drive is completed. It is assumed that the external camera parameters related to the rotation are known in advance from the current position of the attitude of the robot 100 and the rotation completion position.

Next, the control unit 127 determines to which position an overlapping area between a captured image and an expected, captured image upon completion of the rotation corresponds (step S10404). The position correspondence by the rotation matrix can be determined by perspective transformation. The position correspondence by the translation vector can be determined from internal camera parameters and the distance to a subject in the depth direction. It is assumed that the internal camera parameters are measured beforehand. The (representative value of) distance in the depth direction can be preset from the reduction ratio of each pyramid image, the size of a detection window, and the like.

The control unit 127 determines a range to perform face detection (step S10405). A range indicated by the corresponding position determined in step S10404 includes a range after being subjected to the face detection processing. Therefore, based on the detected area data stored in the storage unit 125 and the range indicated by the corresponding position determined in step S10404, the control unit 127 determines a range to perform face detection. Note that the range as the target of the face detection processing can also be set smaller in consideration of a margin.

The control unit 127 determines whether the size of the range determined in step S10405 is equal to or larger than a predetermined value (step S10406). When the size of the determined range is smaller than the predetermined value (No in step S10406), the control unit 127 returns to the processing in step S10403. Although the predetermined value is at least one pixel, it may be set to be a slightly larger value in consideration of the performance of the control unit 127, the computational load, and the like.

When the size of the determined range is equal to or larger than the predetermined value (Yes in step S10406), the control unit 127 performs an image conversion (image cropping) of the range determined in step S10405 (step S10407). Based on the corresponding position determined in step S10404, an image obtained by cropping a range of a part overlapping with the expected captured image at the time of completion of the rotation and plus α is created from the image (captured image) acquired in step S10403. The plus α portion is determined in consideration of the size of the detection window, errors in the external camera parameters, and the like.

The control unit 127 performs face detection on the image created in step S10407 (step S10408).

The method of face detection performed by the control unit 127 is as follows: First, pyramid images are created. The pyramid images are a series of images created by repeatedly reducing the original image by a constant fraction, and a fixed-size face detector can be applied to each level of the pyramid of images to detect various sizes (i.e., corresponding to distances) of a face. Here, since the visibility of the camera by the rotation varies according to the distance to the target, the pyramid images are used to perform face detection.

First, a face search target is set at the first level. Here, the face search target is the original image before the reduction. Then, a first detection window is set. For example, the initial position is set as the upper left corner. A fixed-size face detector is applied to the set detection window. It is then determined whether the search by the slide in this level is completed. When the search by the slide is not completed, the detection window is slid to perform face detection again. When the search by the slide is completed, it is determined whether processing for all levels of pyramid images is completed. When the processing for all the levels is not completed, the current level is shifted to the next level to perform face detection by the slide on the level as the destination as well. When the processing for all the levels is completed, the face detection processing is ended.

Note that when the user P is located close to the robot 100, it is more desirable not to perform face search for a level with a large reduction ratio in consideration that the face may not fit in the captured image and that the percentage of the overall computational load is low.

Figure 5:
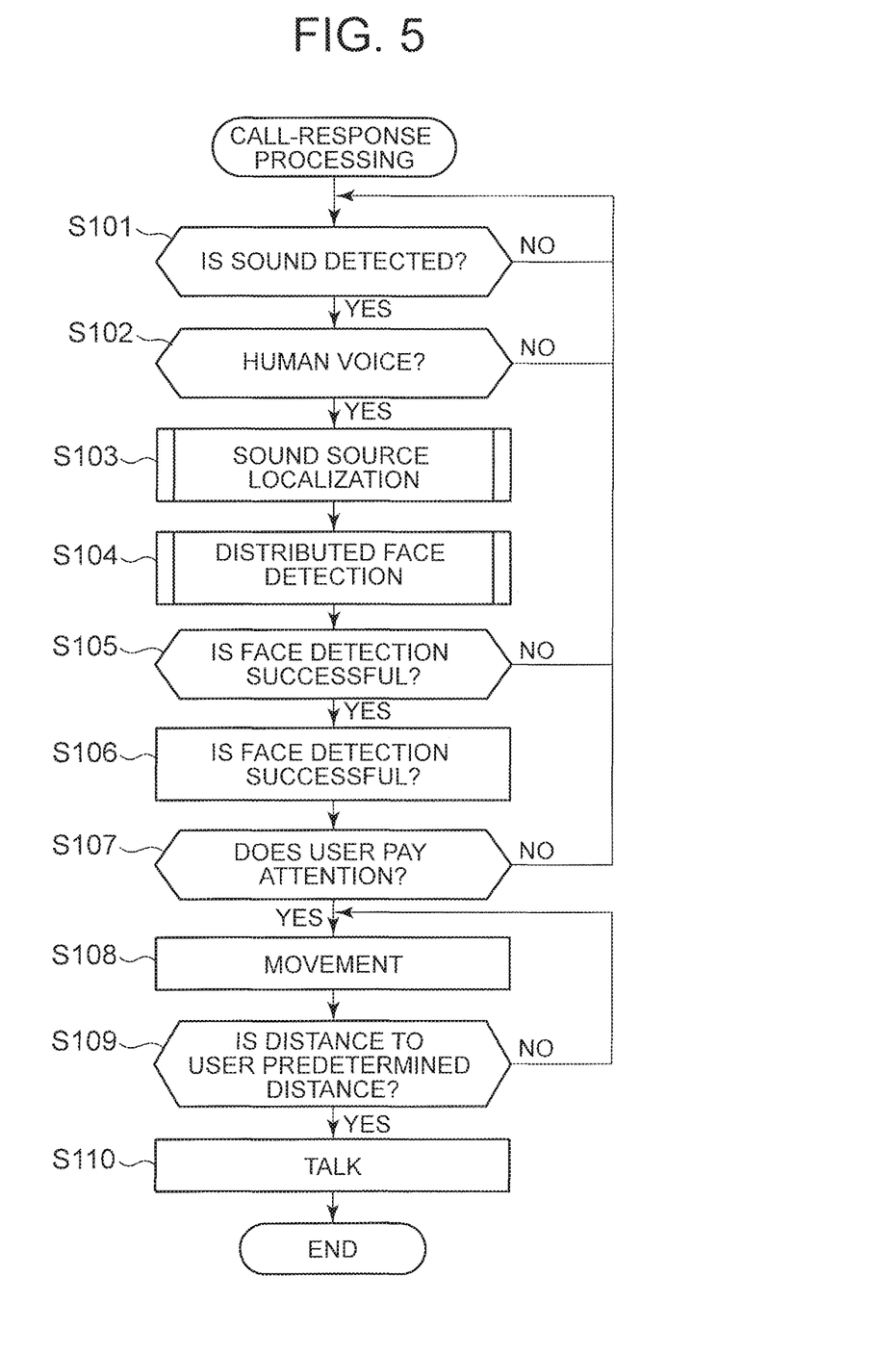
FIG. 5 is a flowchart of call-response processing.
Figure 9:
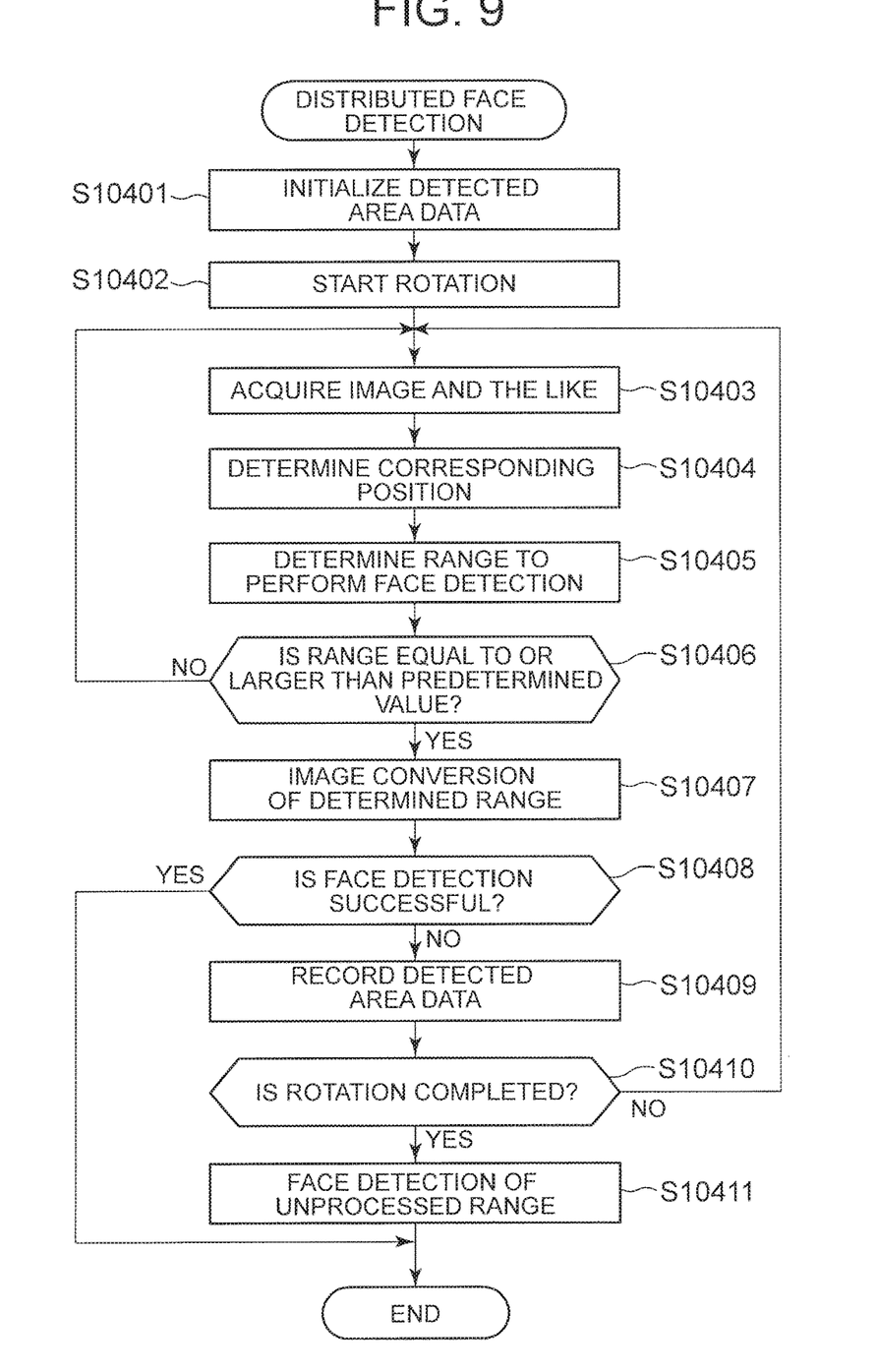
FIG. 9 is a flowchart of distributed face detection processing.

Referring to FIG. 9, when the face detection is determined to be successful (Yes in step S10408), the control unit 127 ends the distributed face detection processing, and proceeds to step S106 in FIG. 5. On the other hand, when the face detection in FIG. 9 is determined not to be successful (No in step S10408), the control unit 127 stores the detected area data in the storage unit 125 (step S10409). Here, the control unit 127 records coordinate values representing the range on which the face detection is determined in step S10408 to be performed.

Then, the control unit 127 determines whether the rotation is completed (step S10410). When determining that the rotation is not completed (No in step S10410), the control unit 127 returns to step S10403 to control the camera 111 to perform imaging again.

On the other hand, when determining to be rotated by the angle θ determined by sound source localization, i.e., determining that the rotation is completed (Yes in step S10410), the control unit 127 performs face detection on a range unprocessed in the expected, captured image at the time of completion of the rotation based on the detected area data stored in the storage unit 125 (step S10411).

Referring to FIG. 5 again, when the face detection is not successful (No in step S105), the control unit 127 returns to step S101 again.

On the other hand, when the face detection is successful (Yes in step S105), the control unit 127 makes a face direction adjustment to confront the user P (step S106). Here, the control unit 127 determines whether to confront the user P, and when determining not to confront the user P, the control unit 127 controls the neck joint 121 to rotate the head 110 so that the face of the robot 100 (the front of the head 110) will confront the user P.

Then, the control unit 127 determines whether the user P pays attention to the robot 100 (step S107). Specifically, the control unit 127 controls the camera 111 to capture an image of the user P, perform face detection on the captured image, and determine whether the face of the user P is facing the robot 100. The determination may also be made based on the duration as well as the orientation of the face. Specifically, the control unit 127 may control the camera 111 to perform imaging plural times during a predetermined period to determine whether the face of the user P faces the robot 100 during the predetermined period and the direction of the face does not change.

Based on the captured image, when determining that the user P does not pay attention to the robot 100 (No in step S107), the control unit 127 returns to step S101 again to wait for sound input.

On the other hand, when determining that the face of the user P faces the robot 100 (Yes in step S107), the control unit 127 moves a predetermined distance to approach the user P (step S108) to determine whether the distance to the user P becomes a predetermined distance (step S109). The predetermined distance between the user P and the robot 100 is such a distance that the robot 100 can recognize the content of a voice uttered by the user P. When determining that the distance between the user P and the robot 100 is less than the predetermined distance (No in step S109), the control unit 127 returns to step S108 again.

On the other hand, when determining that the distance between the user P and the robot 100 becomes the predetermined distance (Yes in step S109), the control unit 127 talks with the user P (step S110). The control unit 127 controls the speaker 113 talks to the user P, for example, "what can I do for you?" Further, the control unit 127 analyzes a speech of the user entered from the microphones 112, and outputs any voice from the speaker 113 based on the analyzed content.

As described above, the face detection processing is started without waiting for completion of the rotation in the embodiment. Therefore, since the range as the target of face detection processing after completion of the rotation becomes narrower than that in the conventional, the time required for the face detection after completion of the rotation can be shortened. Thus, the time point of completion of the face detection can be hastened, and hence the responsiveness of the robot can be improved.

Although the rotation drive is based on the yaw direction in the above description, the same holds true for rotation in any other direction.

Suppose further that the user P can be detected from the captured image with the camera 111 according to the embodiment. In this case, when the user P does not confront the robot 100, the control unit 127 adjusts the direction of the face of the robot 100 to confront the user P as in the processing step S106 of the flow of FIG. 5. Thus, the control unit 127 functions as a face direction adjusting section to enable the user to communicate with the confronting robot 100 smoothly.

The present invention is not limited to the aforementioned embodiment, and various modifications are of course possible without departing from the scope of the present invention.

Although the example of imaging in a period from time t1 to time t4 is illustrated in the description with reference to FIG. 8 and FIG. 10, the timings of imaging during rotation may not be determined times, respectively. The imaging timings are optional. For example, the timings may be such repetitions that imaging is performed after a predetermined time has elapsed since the start of the rotation, and imaging is performed when the predetermined time has further elapsed after the imaging. Alternatively, the next imaging may be started at the timing of completion of the imaging and the face detection processing, rather than the predetermined time interval.

Further, the imaging may be performed or not be performed at the time of staring the rotation. The determination may be made as to whether to perform imaging at the time of start of the rotation according to the determined sound source direction. For example, when the angle between the imaging direction of the camera 111 and the sound source direction is in a predetermined range, imaging is performed at the time of starting the rotation, and in other cases, imaging is not performed at the time of starting the rotation.

In the aforementioned embodiment, the example in which the robot 100 and the user P are both indoors (in the room R) is described, but the face detection processing can be started before completion of the rotation even outdoors.

In the aforementioned embodiment, the imaging and face detection of captured images are repeated until completion of the rotation. However, for example, a timer may be used to perform the imaging and face detection on the next captured image when a predetermined period has elapsed after the imaging and face detection of the first captured image.

In the face detection described above, although each level of the pyramid of images is moved sequentially to perform face detection, the control unit 127 may also estimate distance from the robot 100 to the sound source based on the loudness (magnitude of the amplitude) of voice input to the microphones 112 not to perform face detection on all the levels of pyramid images based on the estimated distance. For example, when the user P is determined to be close to the robot 100, there is no need to use a pyramid image(s) reduced to some extent.

The control unit 127 determines whether the sound emitted from the sound source is directed to the robot 100. The control unit 127 may respond by performing processing such as imaging and face detection only when determining that the sound is directed to the robot 100, and may not respond in the other cases. In this case, for example, a unidirectional microphone can be used as each of the 13 microphones included in the microphones 112 to determine the direction of the sound emitted from the sound source accurately.

The control unit 127 controls the camera 111 at set timing (for example, every hour on the hour or every two hours) to capture images around the own machine and store the captured images in advance in the storage unit 125. Then, after sound is detected by the microphones 112 and the sound source direction is determined, the control unit 127 acquires, from the storage unit 125, images in a range including the determined sound source direction to perform face detection on an overlapping area between the acquired images and images captured with the camera 111.

In this case, when there is no image around the user P as the sound source in the range captured with the camera 111, the face detection is not performed. Thus, the face detection can be performed efficiently without performing wasteful detection processing.

Further, in the aforementioned embodiment, the robot 100 equipped with the camera 111 (imaging unit) is described, the robot 100 does not need to be equipped with the camera 111 (imaging unit), and the robot 100 may receive and process still images captured with another camera.

Further, a face recognition device according to the present invention can be implemented by using a normal computer system, rather than using a dedicated system. For example, the face recognition device that performs the above-described processing may be implemented in such a manner that a program to carry out the above operation is stored on a recording medium (such as a CD-ROM (Compact Disc Read Only Memory) or an MO (Magneto-Optical)) readable by a computer system, distributed to a computer connected to a network, and installed in the computer system.

The method of providing the program to the computer is optional. For example, the program may be uploaded into a bulletin board system (BBS) of a communication line and delivered to the computer through the communication line. Further, the program may be transmitted by modulated waves obtained by modulating carrier waves by a signal representing the program so that the device that received the modulated waves will demodulate the modulated waves to restore the program. Then, the computer runs this program to execute the program in the same manner as other applications under the control of an OS (Operating System). Thus, the computer functions as the face recognition device that performs the above-described processing.

In this invention, various embodiments and modifications are possible without departing from the wide spirit and scope of this invention. Further, the aforementioned embodiment is to describe this invention, and not to limit the scope of this invention. In other words, the scope of this invention is set forth in the scope of claims, rather than in the embodiment. Then, various modifications made in the scope of claims and equivalents shall be included in the scope of this invention.

What is claimed is:

1. An object detection device comprising:
   a storage; and
   a hardware processor which, under control of a program stored in the storage, executes processes comprising:
      a determination process which determines an overlapping area between a first image captured by an imaging device at a first timing, and a second image captured by the imaging device at a second timing later than the first timing; and
      an object detection process which detects an object included in an area of the second image other than the overlapping area determined in the determination process,
   wherein the object detection device further comprises a working part which is operable to change an imaging direction of the imaging device, and
   wherein the imaging device is controlled to perform imaging plural times while the imaging direction of the imaging device is being changed by operation of the working part.

2. The object detection device according to claim 1, wherein the imaging device is controlled to perform the imaging plural times at predetermined time intervals while the imaging direction of the imaging device is being changed by the operation of the working part.

3. The object detection device according to claim 1, wherein the imaging device is controlled to perform a next imaging at a timing of completion of the object detection process while the imaging direction of the imaging device is being changed by the operation of the working part.

4. The object detection device according to claim 1, further comprising:
   a microphone which detects an ambient sound,
   wherein the hardware processor, under control of the program stored in the storage, further executes a sound source direction determining process which determines a direction of a sound source based on the sound detected by the microphone, and
   wherein the working part is controlled to direct the imaging direction of the imaging device to the direction of the sound source determined in the sound source direction determining process by rotating the object detection device so as to make the imaging direction of the imaging device closer to the direction of the sound source.

5. The object detection device according to claim 4, wherein when an angle between the direction of the sound source determined in the sound source direction determining process and the imaging direction of the imaging device at a time of the determination falls within a predetermined range, the imaging device is controlled to perform imaging without the working part rotating the object detection device.

6. The object detection device according to claim 4, wherein the object detection process comprises estimating a distance to an object that emits the sound based on a loudness of the sound detected by the microphone, and using a detection window with a reduction ratio corresponding to the estimated distance to detect the object.

7. The object detection device according to claim 4, wherein the storage further stores captured images taken from around the object detection device, and
   wherein the object detection process comprises acquiring, from the storage, an image captured in the direction of the sound source determined in the sound source direction determining process to perform object detection on an overlapping area between the acquired image and an image captured by the imaging device.

8. The object detection device according to claim 1, wherein the object detection process comprises detecting an object in the first image, and detecting an object included in an area other than the overlapping area determined in the determination process.

9. The object detection device according to claim 1, wherein the object detection process comprises setting, as a detection processed area, an area with respect to which the object detection process has already been performed, to perform detection on an area other than the detection processed area.

10. The object detection device according to claim 1, wherein the object comprises one of a human face, a human body, an object that emits sound, and an object capable of being captured.

11. The object detection device according to claim 1, wherein the determination process comprises determining whether a sound emitted from a sound source is directed to the object detection device, and determining the overlapping area only when it is determined that the sound is directed to the object detection device.

12. An object detection method performed by an object detection device including (i) a storage, (ii) a hardware processor which, under control of a program stored in the storage, controls the object detection device to perform the object detection method, and (iii) a working part, the method comprising:
   determining an overlapping area between a first image captured by an imaging device at a first timing and a second image captured by the imaging device at a second timing later than the first timing;
   detecting an object included in an image of an area of the second image other than the overlapping area determined in the determining;
   operating the working part of the object detection device to change an imaging direction of the imaging device; and
   controlling the imaging device to perform imaging plural times while the imaging direction of the imaging device is being changed by operation of the working part.

13. A non-transitory computer-readable recording medium having a program recorded thereon, the program being executable by a computer of an object detection device that includes a working part, to control the object detection device to execute processes comprising:
   a determination process of determining an overlapping area between a first image captured by an imaging device at a first timing and a second image captured by the imaging device at a second timing later than the first timing;
   an object detection process of detecting an object included in an image of an area of the second image other than the overlapping area determined in the determination process;
   an imaging direction changing process of operating the working part of the object detection device to change an imaging direction of the imaging device; and
   an imaging control process of controlling the imaging device to perform imaging plural times which the imaging direction of the imaging device is being changed by operation of the working part in the imaging direction changing process.

* * * * *